US009490503B1

United States Patent
Cheng et al.

(10) Patent No.: US 9,490,503 B1
(45) Date of Patent: Nov. 8, 2016

(54) ELECTROLYTE FORMULATIONS FOR LITHIUM ION BATTERIES

(71) Applicant: Wildcat Discovery Technologies, Inc., San Diego, CA (US)

(72) Inventors: Gang Cheng, San Diego, CA (US); Ye Zhu, San Diego, CA (US); Deidre Strand, San Diego, CA (US); Boutros Hallac, Franklin, WI (US); Bernhard M. Metz, Glendale, WI (US)

(73) Assignees: WILDCAT DISCOVERY TECHNOLOGIES, INC., San Diego, CA (US); JOHNSON CONTROLS TECHNOLOGY COMPANY, Holland, MI (US)

( * ) Notice: Subject to any disclaimer, the term of this patent is extended or adjusted under 35 U.S.C. 154(b) by 0 days.

(21) Appl. No.: 14/746,746

(22) Filed: Jun. 22, 2015

(51) Int. Cl.
*H01M 10/0525* (2010.01)
*H01M 4/485* (2010.01)
*H01M 10/0569* (2010.01)

(52) U.S. Cl.
CPC ......... *H01M 10/0569* (2013.01); *H01M 4/485* (2013.01); *H01M 10/0525* (2013.01); *H01M 2300/0028* (2013.01); *H01M 2300/0037* (2013.01)

(58) Field of Classification Search
CPC ............... H01M 10/0569; H01M 10/0525; H01M 4/485; H01M 2300/0028; H01M 2300/0037
See application file for complete search history.

(56) References Cited

U.S. PATENT DOCUMENTS

| 7,189,477 | B2 | 3/2007 | Mikhaylik |
| 8,048,562 | B2 | 11/2011 | Pozin et al. |
| 8,865,353 | B2 | 10/2014 | Abe et al. |
| 2008/0248375 | A1* | 10/2008 | Cintra et al. ............ 429/94 |
| 2012/0021296 | A1* | 1/2012 | Funada et al. ............ 429/300 |
| 2013/0252113 | A1 | 9/2013 | Yu et al. |
| 2015/0079459 | A1 | 3/2015 | Nakamura |

FOREIGN PATENT DOCUMENTS

| EP | 1030399 B1 | 5/2009 | |
| EP | 2355213 B1 | 10/2014 | |
| JP | 2003059531 A | 2/2003 | |
| JP | 2008269980 | * 11/2008 | ......... H01M 10/36 |
| JP | 2008269980 A | 11/2008 | |
| WO | 2014080039 A1 | 5/2014 | |
| WO | 2014118138 A1 | 8/2014 | |

OTHER PUBLICATIONS

International Search Report & Written Opinion issued Sep. 12, 2016 in International application No. PCT/US2016/038573.

\* cited by examiner

*Primary Examiner* — Patrick Ryan
*Assistant Examiner* — Aaron Greso
(74) *Attorney, Agent, or Firm* — Corridor Law Group, P.C.

(57) ABSTRACT

Electrolyte solutions including combinations of high dielectric and low viscosity solvents. These solvent combinations provide low temperature performance and high temperature stability in lithium ion battery cells.

12 Claims, 8 Drawing Sheets

ELECTROLYTE FORMULATIONS FOR LITHIUM ION BATTERIES

BACKGROUND OF THE INVENTION

The present invention is in the field of battery technology and, more particularly, electrolyte formulations that enable both low temperature and high temperature operation of lithium ion batteries.

Certain applications for lithium ion batteries require wide operating temperature ranges. In general, the power capability of lithium ion batteries suffers at low temperature due to one or more of the following factors: 1) an increase in viscosity of the electrolyte resulting in slower lithium ion diffusion; 2) a decrease in the ionic conductivity of the electrolyte; 3) a decrease in ionic conductivity of the solid electrolyte interphase (SEI) on the anode; and 4) a decrease in the diffusion rate of lithium ions through the electrode materials, especially the anode materials.

In the past, solutions to the problems associated with operating a lithium ion battery at low temperature have involved adding solvents that have very low melting points and/or low viscosity to the electrolyte formulation. Such additional solvents can help prevent the electrolyte solution from freezing or having substantially increased viscosity at low temperatures. However, such additional solvents tend to be detrimental to the high temperature performance of a lithium ion battery, and in particular the high temperature cycle life.

Certain of the shortcomings of known electrolyte formulations are addressed by embodiments of the invention disclosed herein by, for example, improving power performance at low temperature without substantially decreasing high temperature cycle life.

BRIEF SUMMARY OF THE INVENTION

Embodiments of the invention include a lithium ion battery cell having a first electrode, a second electrode formed of lithium titanate and an electrolyte solution. The electrolyte solution includes sulfolane and a low viscosity solvent, such as diethyl carbonate, methyl butyrate, methyl acetate, methyl propionate, isobutyl acetate, methyl trimethyl acetate, methyl isovalerate, and combinations thereof. In some embodiments, the electrolyte solution does not contain ethylene carbonate or propylene carbonate. In some embodiments, the electrolyte solution contains a blend of sulfolane and propylene carbonate.

Embodiments of the invention include a lithium ion battery cell having a first electrode, a second electrode comprising lithium titanate, and an electrolyte solution. The electrolyte solution includes a high dielectric solvent and a solvent such as diethyl carbonate, methyl butyrate, methyl acetate, methyl propionate, isobutyl acetate, methyl trimethyl acetate, methyl isovalerate, and combinations thereof. In some embodiments, the high dielectric solvent includes sulfolane. In some embodiments, the electrolyte solution does not contain ethylene carbonate or propylene carbonate. In some embodiments, the electrolyte solution contains a blend of sulfolane and propylene carbonate.

DETAILED DESCRIPTION OF THE INVENTION

Figure 1B:
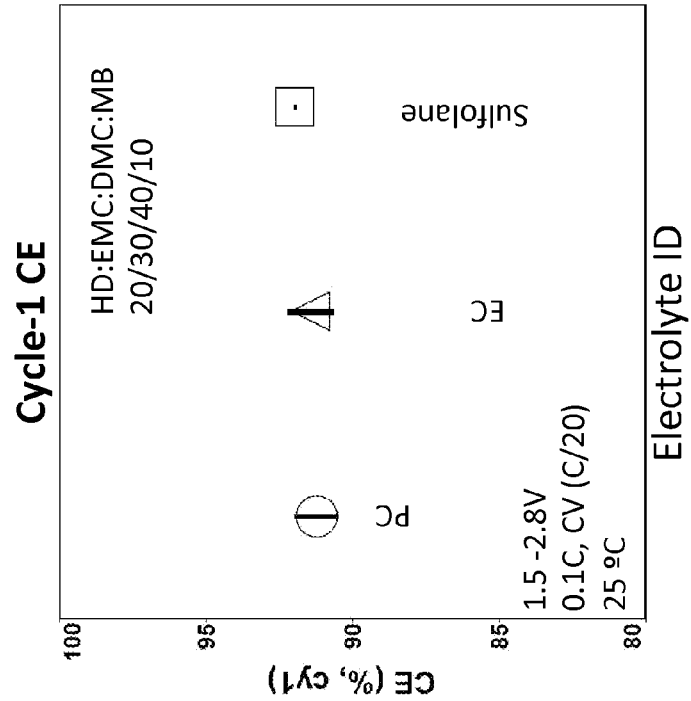
FIGS. 1A and 1B illustrate electrochemical performance characterization of battery cells assembled to contain electrolyte solutions made from formulations of certain embodiments of the invention and control electrolyte solutions.

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

A rate "C" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

To the extent certain battery characteristics can vary with temperature, such characteristics are specified at room temperature (about 25 degrees C.), unless the context clearly dictates otherwise.

Ranges presented herein are inclusive of their endpoints. Thus, for example, the range 1 to 3 includes the values 1 and 3 as well as intermediate values.

The term "NMC" refers generally to cathode materials containing $LiNi_xMn_yCo_zO_w$, and includes, but is not limited to, cathode materials containing $LiNi_{0.33}Mn_{0.33}Co_{0.33}O_2$.

Lithium ion batteries are assembled using an electrode pair (an anode and a cathode) and a separator disposed between the anode and the cathode. Lithium ions are conducted by an electrolyte also contained within the battery cell. An electrolyte can include one or more solvents and one or more salts, such as a set of lithium containing salts in the case of lithium ion batteries. Examples of conventional solvents include nonaqueous electrolyte solvents for use in lithium ion batteries, including carbonates, such as ethylene carbonate, dimethyl carbonate, ethyl methyl carbonate, propylene carbonate, methyl propyl carbonate, and diethyl carbonate.

Lithium titanate (e.g., $Li_4Ti_5O_{12}$; other stoichiometric ratios are included in the definition of lithium titanate) ("LTO") can be used as an active electrode material for an electrode in battery cell applications that require high power but do not require high energy density. Batteries with LTO electrodes can operate at a potential of 1.5 V, resulting in comparatively lower energy density relative to cells having a graphite electrode, which operate at a potential of about 0.05 V.

In many lithium ion batteries using conventional electrolyte formulations, components within the electrolyte solution facilitate the in-situ formation of a protective film during the initial battery cycling. This is referred to as a solid electrolyte interphase (SEI) layer on or next to an anode. The anode SEI can inhibit further reductive decomposition of the electrolyte components. However, it has been observed that SEI formation generally does not occur in battery cells with LTO anode operated at the comparably higher voltages as described above. Recalling the factors above that are believed to limit low temperature performance ((1) an increase in viscosity of the electrolyte resulting in slower lithium ion diffusion; (2) a decrease in the ionic conductivity of the electrolyte; (3) a decrease in ionic conductivity of the SEI on the anode; and 4) a decrease in the diffusion rate of lithium ions through the electrode materials, especially the anode materials), the lack of SEI on an LTO anode means that the electrolyte formulation strongly influences the low temperature performance of batteries with LTO anodes.

At high temperature, stability of the battery cell can become compromised. Instability at high temperature is believed to be due to: 1) increased reactivity of electrolyte with an active material; 2) accelerated decomposition of $LiPF_6$, which generates decomposition products that can be reactive with the both the electrolyte and the electrode active materials. Parasitic reactions driven by the decomposition products can result in loss of cell capacity and further decomposition of any SEI.

Referring specifically to battery cells containing an LTO electrode, the high temperature stability of the electrolyte formulation can be compromised by catalytic effects of the titanium in certain oxidation states. At a higher oxidation state, titanium tends to undergo a proton extraction reaction.

In view of the specific conditions present during the low temperature operation and high temperature storage of lithium ion battery cells assembled to contain an LTO electrode, the electrolyte solution within the lithium ion battery cell should include solvents with good low temperature properties (e.g., low melting point, low viscosity, and high conductivity) and good stability in the presence of titanium ions (e.g., $Ti^{3+}$, $Ti^{4+}$) at elevated temperatures.

Electrolyte formulations used in lithium ion batteries generally consist of at least two solvent types: a high dielectric constant (HD) solvent and a low viscosity solvent (LV). The HD solvent is used to solvate the lithium ions that are conducted through the electrolyte. HD solvents tend to have comparatively high viscosities and/or high melting points, which can be detrimental to low temperature performance. HD solvents as described herein are solvents that have a dielectric constant of greater than about 40 at room temperature and are otherwise suitable for use in a lithium ion battery.

Thus, LV solvents are added to the electrolyte formulation to ensure adequate diffusion of the solvated lithium ions. However, LV solvents often have comparatively lower thermal stability (they may have a relatively low boiling point, for example) and can compromise the high temperature stability of the electrolyte formulation.

For reference, Table 1 presents melting points and viscosities for ethylene carbonate, propylene carbonate, and sulfolane.

TABLE 1

| Solvent properties | | |
|---|---|---|
| Solvent | Melting point (degrees C.) | Viscosity (cP) |
| ethylene carbonate | 36 | 1.86 (40 degrees C.) |
| propylene carbonate | −49 | 2.5 (25 degrees C.) |
| sulfolane | 27.5 | 10.3 (30 degrees C.) |

According to embodiments of the invention disclosed herein, the solvent sulfolane (tetrahydrothiophene 1,1-dioxide; $C_4H_8O_2S$) is used in place of the conventional high dielectric solvents ethylene carbonate or propylene carbonate. Structure (a) below represents sulfolane:

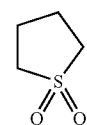

(a)

Most conventional electrolyte formulations contain ethylene carbonate (EC) as an HD solvent. EC plays an important role in the formation of a stable SEI, especially with carbon-based electrodes. But, an SEI is not generally formed in the lithium ion battery cells using LTO electrodes under the conditions described herein. Other carbonate solvents, such as propylene carbonate (PC) are commonly used with carbon-based electrodes to partially replace EC to improve low temperature performance. As seen in Table 1, PC has a lower melting point and viscosity than EC. But, as demonstrated by the results presented herein, PC is inferior to sulfolane in lithium ion batteries with LTO electrodes in spite of the higher melting point and higher viscosity of the sulfolane.

Thus, an aspect of the inventive electrolyte formulations disclosed herein is the identification of the role of the inferior high dielectric solvents EC and PC in the poor low temperature performance of lithium ion batteries with LTO electrodes. A further aspect of the inventive electrolyte formulations disclosed herein is the replacement of those poor performing solvents with the superior performing solvent sulfolane.

As described above, solvents that improve low temperature performance can compromise high temperature stability. Further, combinations of solvents can behave unpredictably during charge and discharge cycles in electrochemical cells. According to embodiments of the invention disclosed herein, certain low viscosity solvents can be combined with sulfolane in lithium ion batteries with LTO electrodes. Such low viscosity solvents include certain ester-type solvents. Based on the testing and analysis conducting herein, a set of exemplary solvents has been identified to perform well in both the low and high temperature testing, and these solvents work well in combination with sulfolane in lithium ion batteries with LTO electrodes.

Low viscosity (LV) solvents as described herein are solvents that have a viscosity of less than about 1.0 cP at room temperature and are otherwise suitable for use in a lithium ion battery with respect to properties such as electrochemical stability. Certain preferred low viscosity solvents include methyl butyrate ($C_5H_{10}O_2$; structure (b)); methyl acetate ($C_3H_6O_2$; structure (c)), methyl propionate ($C_4H_8O_2$; structure (d)), isobutyl acetate ($C_6H_{12}O_2$; structure (e)), methyl trimethyl acetate ($C_6H_{12}O_2$; structure (f)), and methyl isovalerate ($C_6H_{12}O_2$; structure (g)):

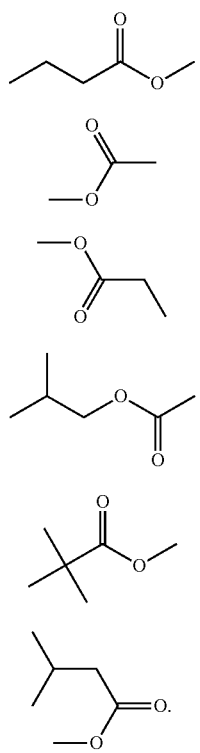

Other solvents may also be present in the electrolyte formulation. For example, linear carbonates, including but not limited to dimethyl carbonate, ethyl methyl carbonate, and diethyl carbonate, may be present in the electrolyte formulation.

According to certain embodiments of the invention, sulfolane can be used in solvent blends in combination with other HD solvents, such as PC. Further, these solvent blends can include a combination of linear carbonates and one or more other LV solvents. Disclosed herein are several solvent blends that show unexpected performance at certain critical volumetric ratios. The discovery of these solvent blends capable of wide operating temperature performance relied on optimizing the relationships between the HD and LV solvents. A series of experiments examining these relationships is presented below.

Low temperature performance is characterized by the area specific impedance (ASI), which includes contributions due to the electrode materials, the SEI layers formed on those materials, and the bulk electrolyte properties. As this is a measure of impedance, low ASI values are desirable.

High temperature performance is characterized by measuring the change in ASI after storage at elevated temperature. Again, small changes in the ASI after storage are desirable, as that would indicate stability of the cell while stored at elevated temperature.

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

EXAMPLES

Battery Assembly.

Battery cells were assembled in a high purity argon filled glove box (M-Braun, oxygen and humidity content less than 0.1 ppm). A $LiNi_xMn_yCo_zO_2$ (x+y+z~1) NMC material and a lithium titanate (LTO) material were used for the electrode pair (e.g., cathode and anode). Each battery cell included a composite electrode film made from the NMC material, a polyolefin separator, and a composite electrode film made from the LTO material. Electrolyte formulations were made according to the ratios and components described herein and added to the battery cell.

Electrolyte Solution Formulation.

Electrolyte formulas included a lithium salt and a solvent blend. The lithium salt was $LiPF_6$, and was used at a concentration of 1.2M. The solvent blends typically included a high dielectric (HD) solvent, certain conventional carbonate solvents such as ethyl methyl carbonate (EMC) and dimethyl carbonate (DMC), and optionally a low viscosity (LV) solvent.

Electrochemical Formation.

The formation cycle for these NMC//LTO battery cells was a 6 hour open circuit voltage (OCV) hold followed by a charge to 2.8 V at rate C/10, with a constant voltage (CV) hold to C/20. The formation cycle was completed with a C/10 discharge to 1.5 V. All formation cycles were run at room temperature.

Electrochemical Characterization.

Initial area specific impedance (ASI) was measured after setting the target state of charge (SOC) (by discharging the cell at rate of C/10), and then applying a 10 second pulse at a rate of 5C. Low temperature ASI results were derived as follows: The cell was recharged to 2.8 V at a rate of C/5 at room temperature, with a CV hold at C/10 followed by a one hour OCV hold. Then, the ambient temperature was reduced to −25 degrees Celsius, followed by a 12 hour OCV hold to allow the test system temperature to equilibrate. All discharges to the specified SOC where conducted at −25 degrees Celsius at a rate of C/10, with a one hour rest at the specified SOC. A discharge pulse at 50% SOC was done at a rate of 2C for 20 seconds, followed by a 40 second rest. ASI was calculated from the initial voltage (V) prior to the pulse and the final voltage ($V_f$) at the end of the pulse according to Formula (1), where A is the cathode area and i is the current:

$$ASI(\Omega \cdot cm^2) = \frac{(v_i - v_f) \times A}{i} \quad (1)$$

After full recharge to 2.8 V at room temperature, the cells were then stored at 60 degrees Celsius at OCV for two weeks. After two weeks the cells were removed from high temperature storage and then allowed to equilibrate to room temperature. The ASI was then measured by the same protocol used to determine initial ASI (setting the target SOC, and then applying a 10 second pulse at a rate of 5C).

RESULTS

Figure 1A:
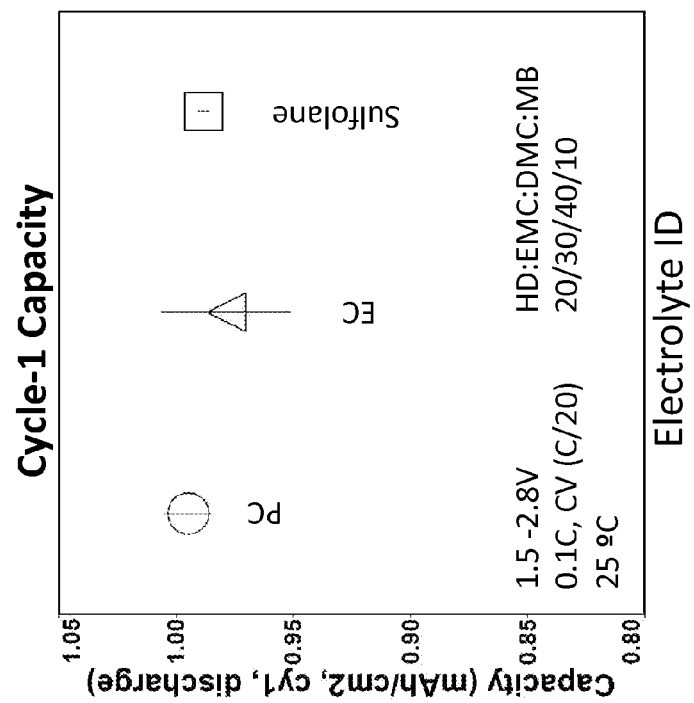

FIGS. 1A and 1B illustrate electrochemical performance characterization of battery cells assembled to contain electrolyte solutions made from formulations of certain embodiments of the invention and control electrolyte solutions. In this testing, the solvent blend was HD/EMC/DMC/MB at 20/30/40/10 by volume, where HD is sulfolane for the test embodiment and HD is either EC or PC for the control embodiments. MB is methyl butyrate. The tested cells were charged to 2.8 V at a rate of 0.1 C with a CV hold to C/20 before discharge to 1.5V at 0.1C. Referring to FIG. 1A, the first cycle discharge capacity (measured in mAh/cm$^2$) was tested for a test embodiment and two controls. Referring to FIG. 1B, the coulombic efficiency (measured as a percentage) was tested for a test embodiment and two controls.

FIGS. 1A and 1B demonstrate that no negative effect on initial discharge capacity or coulombic efficiency was observed with the use of electrolyte solutions formulated according to certain embodiments disclosed herein. Thus, FIGS. 1A and 1B demonstrate that replacing EC or PC with sulfolane does not diminish certain electrochemical properties of the electrolyte formulation as compared to conventional formulations.

Figure 2B:
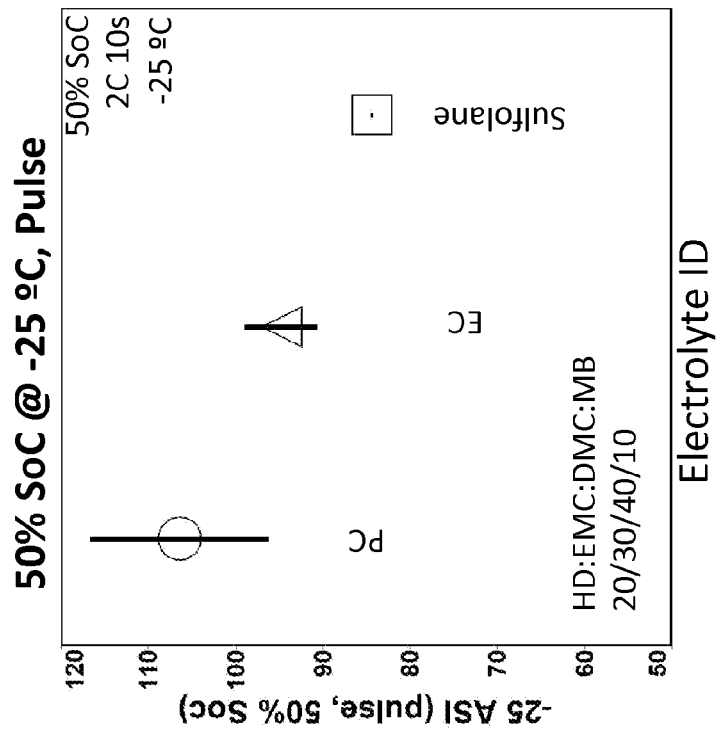
FIGS. 2A and 2B illustrate low temperature electrochemical performance characterization of battery cells assembled to contain electrolyte solutions made from formulations of certain embodiments of the invention and control electrolyte solutions.
Figure 2A:
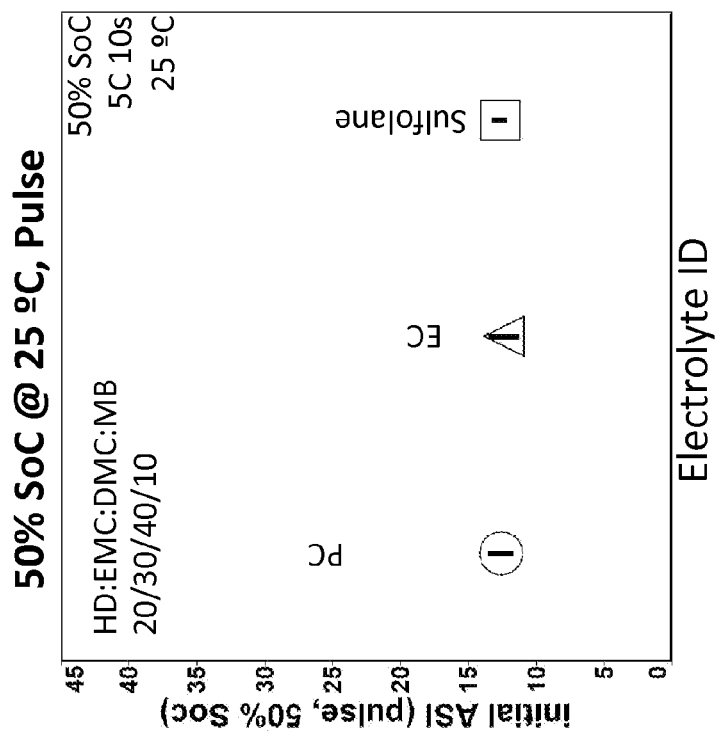

FIG. 2 illustrates low temperature electrochemical performance characterization of battery cells assembled to contain electrolyte solutions made from formulations of certain embodiments of the invention and control electrolyte solutions. The cells were tested at a 50% state of charge and at a low temperature of −25 degrees Celsius.

FIG. 2 demonstrates that electrolyte solutions formulated according to certain embodiments disclosed herein showed superior low temperature performance as compared to control electrolyte formulations containing EC or PC. Superior low temperature performance in this instance is characterized by lower ASI at −25 degrees Celsius.

Figure 3B:
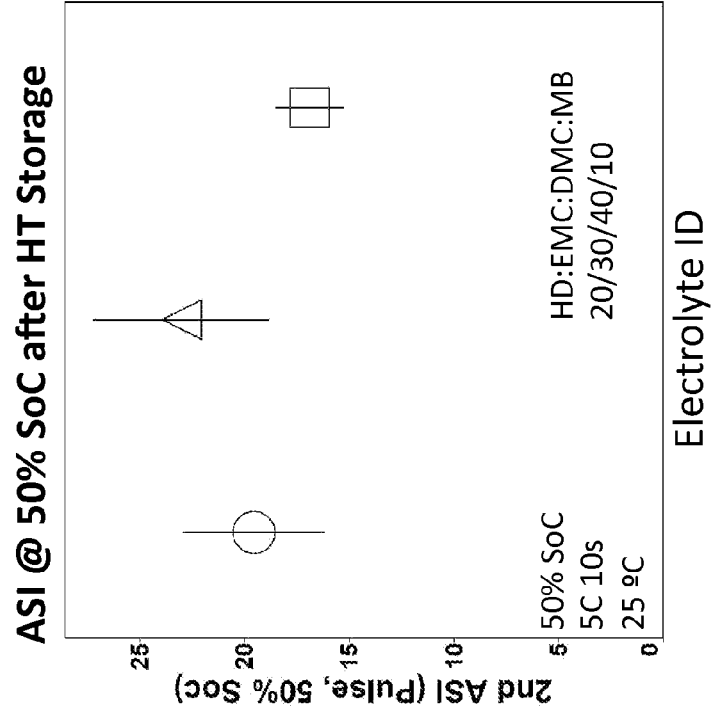
FIGS. 3A and 3B illustrate electrochemical performance characterization before and after high temperature storage for battery cells assembled to contain electrolyte solutions made from formulations of certain embodiments of the invention and control electrolyte solutions.
Figure 3A:
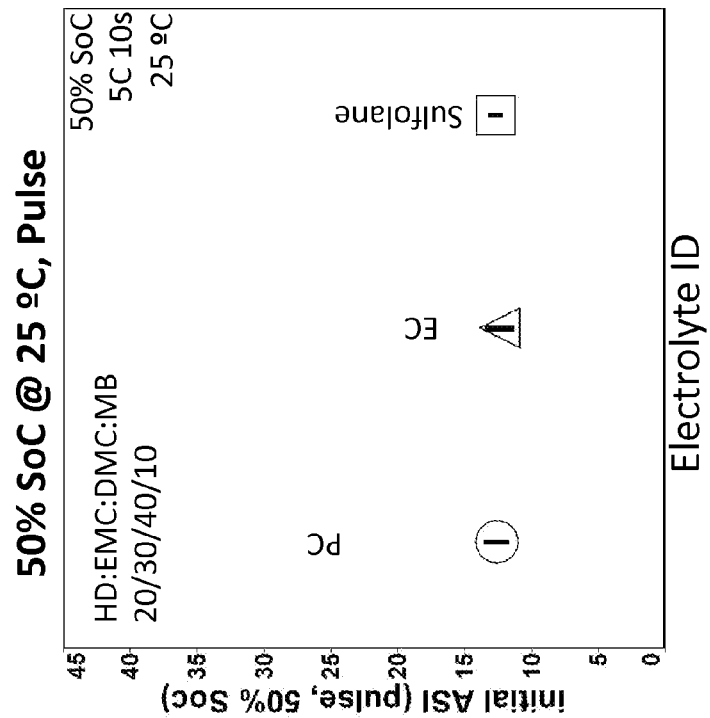

FIGS. 3A and 3B illustrate electrochemical performance characterization before and after high temperature storage for battery cells assembled to contain electrolyte solutions made from formulations of certain embodiments of the invention and control electrolyte solutions. As seen in FIG. 3A, the initial ASI before high temperature storage is similar for the inventive and control electrolyte solutions. However, as shown in FIG. 3B, the final ASI (labeled as "2nd ASI") after high temperature storage is lower for the sulfolane formulation than those containing either EC or PC. FIG. 3B illustrates that there is a smaller change in ASI during high temperature storage.

Thus, FIGS. 3A and 3B demonstrate that the use of electrolyte solutions formulated according to certain embodiments disclosed herein show improved high temperature stability as compared to control electrolyte formulations containing EC or PC.

Figure 4:
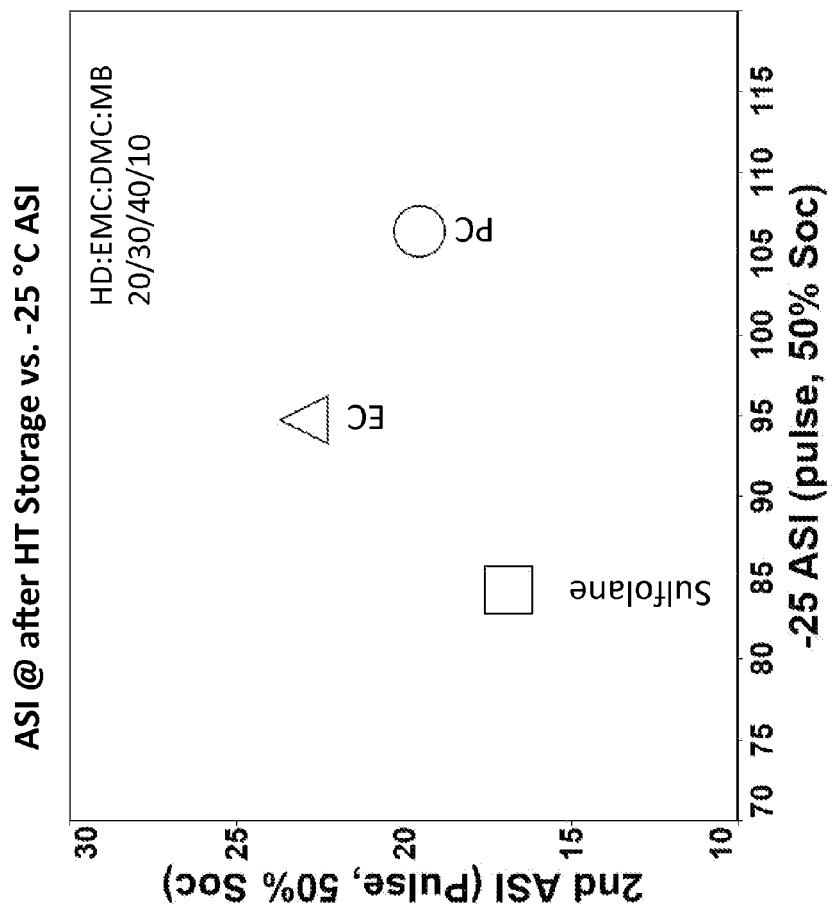
FIG. 4 illustrates low temperature and high temperature electrochemical performance characterization of battery cells assembled to contain electrolyte solutions made from formulations of certain embodiments of the invention and control electrolyte solutions.

FIG. 4 illustrates low temperature and high temperature electrochemical performance characterization of battery cells assembled to contain electrolyte solutions made from formulations of certain embodiments of the invention and control electrolyte solutions. The superior wide temperature range performance can be best observed by looking at both axes of the plot in FIG. 4, where the sulfolane formulation shows the best performance at low temperature and after high temperature storage. The y-axis indicates the performance after high temperature storage while the x-axis indicates the performance at low temperature. Thus, the formulation with the best performance over a wide temperature range will have values near the intersection of the two axes.

FIG. 4 demonstrates that the use of electrolyte solutions formulated according to certain embodiments disclosed herein results in comparatively wider operating temperature performance relative to control electrolyte formulations containing EC or PC.

Figure 5:
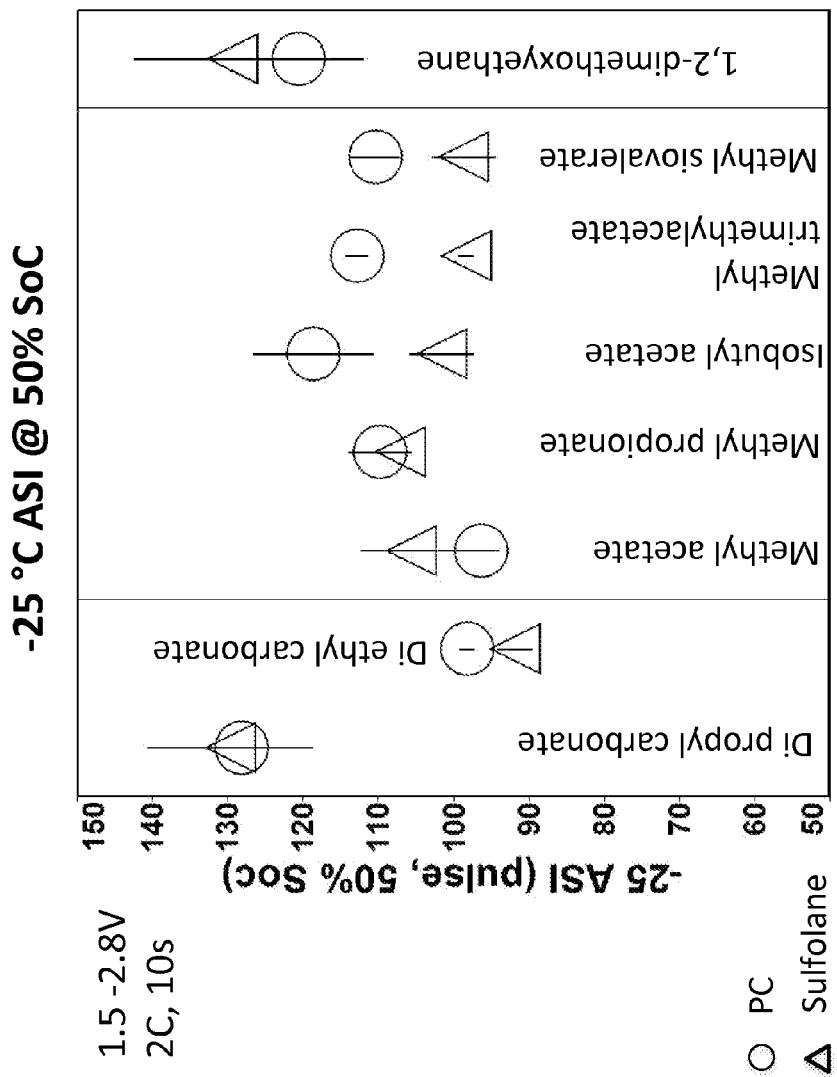
FIG. 5 illustrates low temperature electrochemical performance characterization of battery cells assembled to contain electrolyte solutions made from formulations of certain embodiments of the invention and control electrolyte solutions, where the solutions further include low viscosity solvents.

FIG. 5 illustrates low temperature electrochemical performance characterization of battery cells assembled to contain electrolyte solutions made from formulations of certain embodiments of the invention and control electrolyte solutions, where the solutions further include low viscosity solvents. In this testing, the solvent blend was HD/EMC/DMC/LV at 20/30/40/10 by volume, where HD is sulfolane for the test embodiments and HD is PC for the control embodiment. LV was selected from a variety of solvents, including diethyl carbonate (DEC), methyl butyrate (MB), methyl acetate (MA), methyl propionate (MP), isobutyl acetate (IA), methyl trimethyl acetate (MTMA), methyl isovalerate (MI), and 1,2-dimethoxyethane (DME). The test conditions in represented in FIG. 5 were similar to those of FIG. 2.

FIG. 5 demonstrates that the use of electrolyte solutions formulated according to certain embodiments disclosed herein show improved low temperature performance as compared to control electrolyte formulations containing PC. In this instance, a variety of low viscosity solvents were used in combination with the high dielectric solvents. Of the low viscosity solvents tested, the class of solvents containing ester linkages performed the best in this testing. And, the ester-containing solvents performed best in formulations that also contained sulfolane.

The results disclosed herein demonstrate unexpected superior performance in certain solvent combination according to embodiments of the invention herein. In a preferred embodiment, the high dielectric solvent sulfolane replaces the high dielectric solvents ethylene carbonate and/or propylene carbonate. As compared to prior systems of solvent combinations used in lithium ion batteries, the sulfolane combination disclosed herein does not include the high dielectric solvents ethylene carbonate and/or propylene carbonate. This exclusion is preferred in lithium ion battery cells including an LTO electrode, as the LTO electrode does not require the formation of an SEI under certain operating conditions. Further, sulfolane can be combined with certain ester-type low viscosity solvents to provide high temperature stability in addition to low temperature performance. These preferred solvent combinations yield superior performance in lithium ion battery cells including an LTO electrode as compared to conventional solvent systems.

Figure 6A:
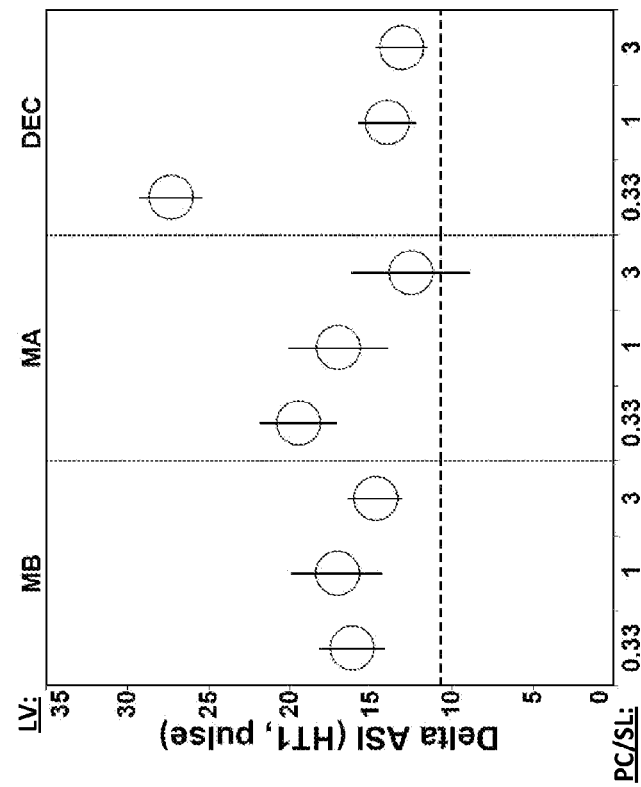
FIGS. 6A and 6B illustrate low temperature and high temperature electrochemical performance characterization of battery cells assembled to contain electrolyte solutions made from formulations of certain embodiments of the invention and control electrolyte solutions.
Figure 6B:
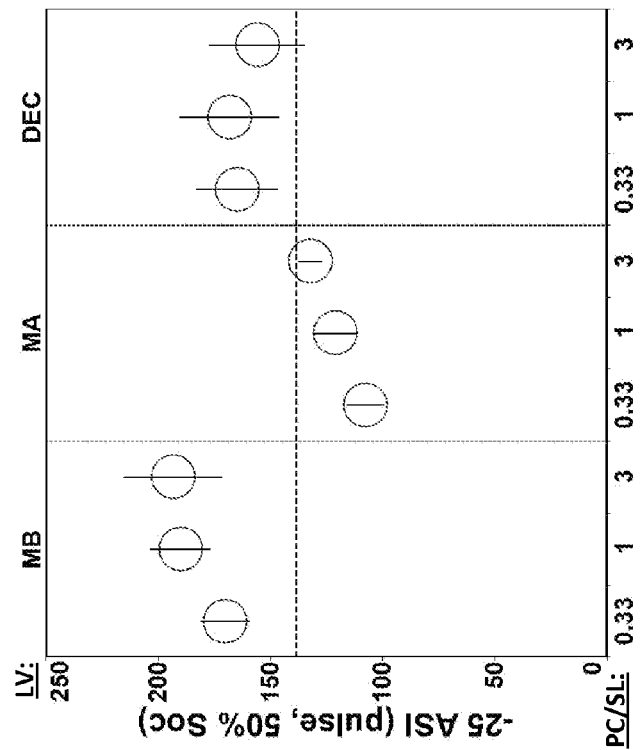

FIGS. 6A and 6B illustrate low temperature and high temperature electrochemical performance characterization of battery cells assembled to contain electrolyte solutions made from formulations of certain embodiments of the invention and control electrolyte solutions. In these embodiments, the combination of HD solvents was tested with certain LV solvents.

For these solvent blends, the solvents EMC and DMC were always present, while an additional LV solvent was varied. This collective component of the solvent blend is referred to as the non-polar (NP) component. That is, NP includes EMC+DMC+LV, where LV is chosen from MB, MA, and DEC.

The HD solvents were PC and sulfolane, and were tested in ratios of 1:3, 1:1, and 3:1 by volume (indicated as 0.33, 1, and 3, respectively, along the x-axis of the FIGS. 6A and 6B). The NP solvents were tested in a ratio of EMC:DMC: LV=3:4:1. And, the ratio of HD:NP=1:4. The control formulation was PC/EMC/DMC/MB (2/3/4/1, v/v) 1.2M LiPF6 and is represented by a dotted line in the figures.

Therefore, the electrolyte formulations tested in FIGS. 6A and 6B can be represented as:

1.2M LiPF6, PC/Sulfolane/EMC/DMC/LV (5/15/30/40/ 10)

1.2M LiPF6, PC/Sulfolane/EMC/DMC/LV (10/10/30/40/ 10)

1.2M LiPF6, PC/Sulfolane/EMC/DMC/LV (15/5/30/40/ 10)

Referring to FIG. 6A, which illustrates the results of low temperature testing, methyl acetate (MA), provided the best low temperature power performance for all of the HD ratios. With MA as the LV solvent, the low temperature power performance was directly related to the amount of sulfolane in the blend.

Referring to FIG. 6B, the solvent blends showed similar high temperature stability, with the most important factor being the ratio of PC to sulfolane. For high temperature stability, higher PC content was preferred.

Figure 7B:
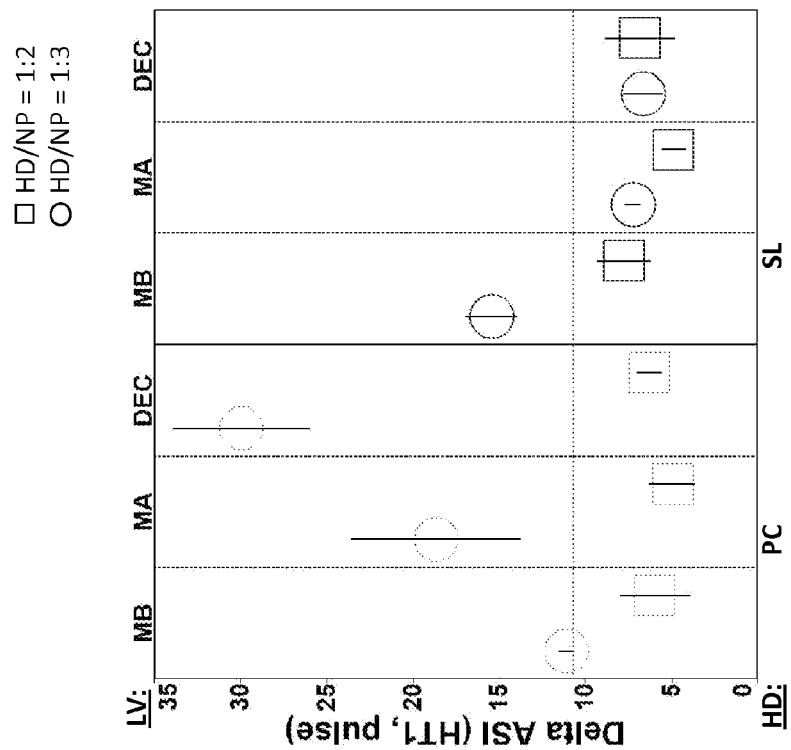
FIGS. 7A and 7B illustrate low temperature and high temperature electrochemical performance characterization of battery cells assembled to contain electrolyte solutions made from formulations of certain embodiments of the invention and control electrolyte solutions.
Figure 7A:
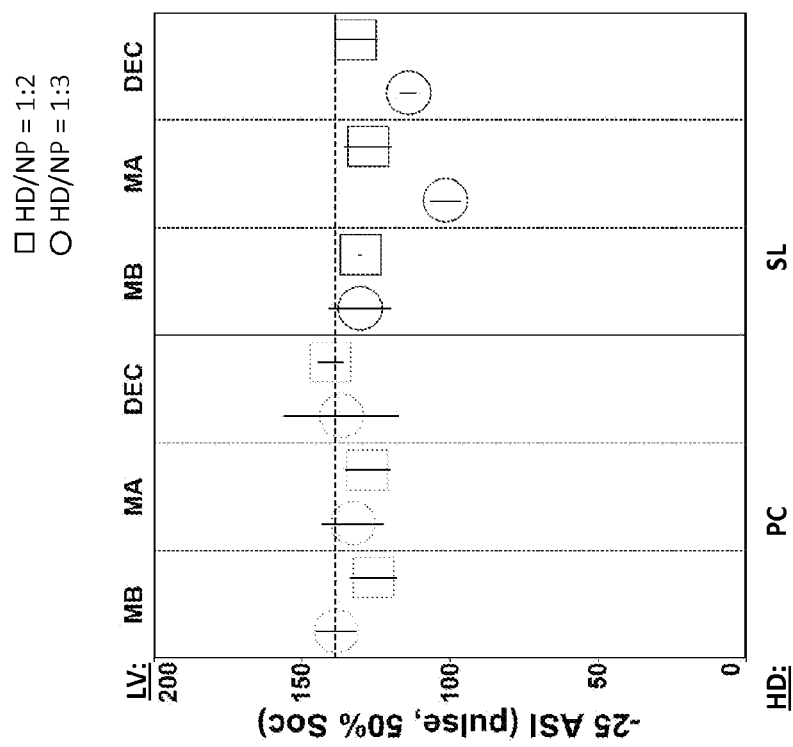

FIGS. 7A and 7B illustrate low temperature and high temperature electrochemical performance characterization of battery cells assembled to contain electrolyte solutions made from formulations of certain embodiments of the invention and control electrolyte solutions. In these embodiments, the ratio of HD solvents to certain LV solvents was varied.

Again, the HD solvents were PC or sulfolane; the LV solvents were MB, MA, and DEC; and the NP solvents were EMC+DMC+LV (at a ratio of 3:4:1). The ratios of HD:NP were 1:2 or 1:3. The control formulation was PC/EMC/ DMC/MB (2/3/4/1, v/v) 1.2M LiPF6 and is represented by a dotted line in the figures.

FIG. 7A illustrates that sulfolane provided better low temperature power performance than PC, especially with MA and DEC. FIG. 7B illustrates that sulfolane also provided superior high temperature stability as compared to PC.

Preferred electrolyte formulations identified in this testing can be represented as:

1.2M LiPF6, Sulfolane/EMC/DMC/MA (25/28.1/37.5/ 9.4)

1.2M LiPF6, Sulfolane/EMC/DMC/DEC (25/28.1/37.5/ 9.4)

Synergistic low temperature power performance was observed when combining sulfolane with MA. The ratio of HD/NP solvent as well as HD and NP composition affected low temperature and high temperature performance, but overall the performance was dependent on the identity of the HD solvent. However, the optimal composition of PC or sulfolane is not predictable based on their chemical properties.

Figure 8A:
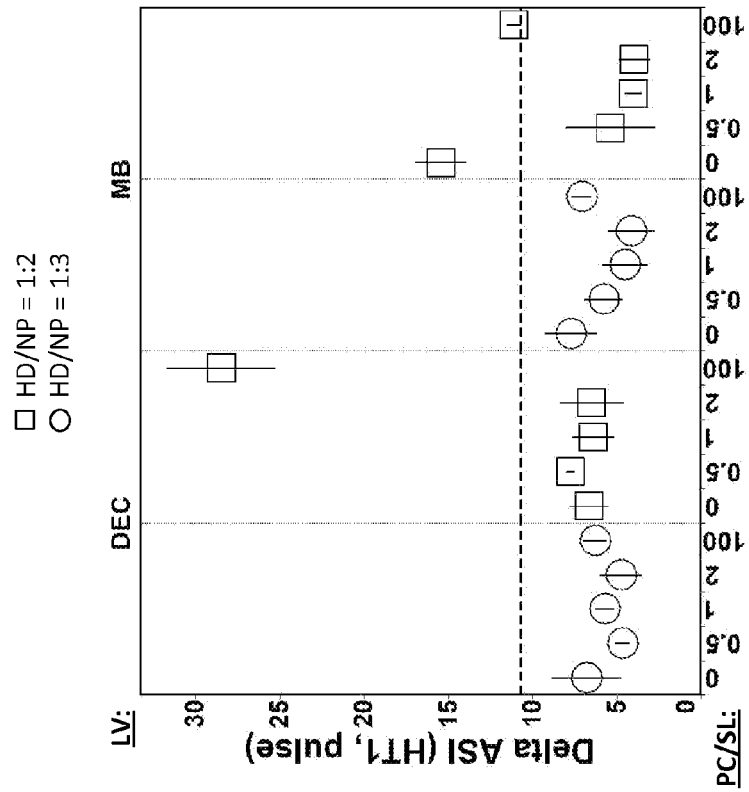
FIGS. 8A and 8B illustrate low temperature and high temperature electrochemical performance characterization of battery cells assembled to contain electrolyte solutions made from formulations of certain embodiments of the invention and control electrolyte solutions.
Figure 8B:
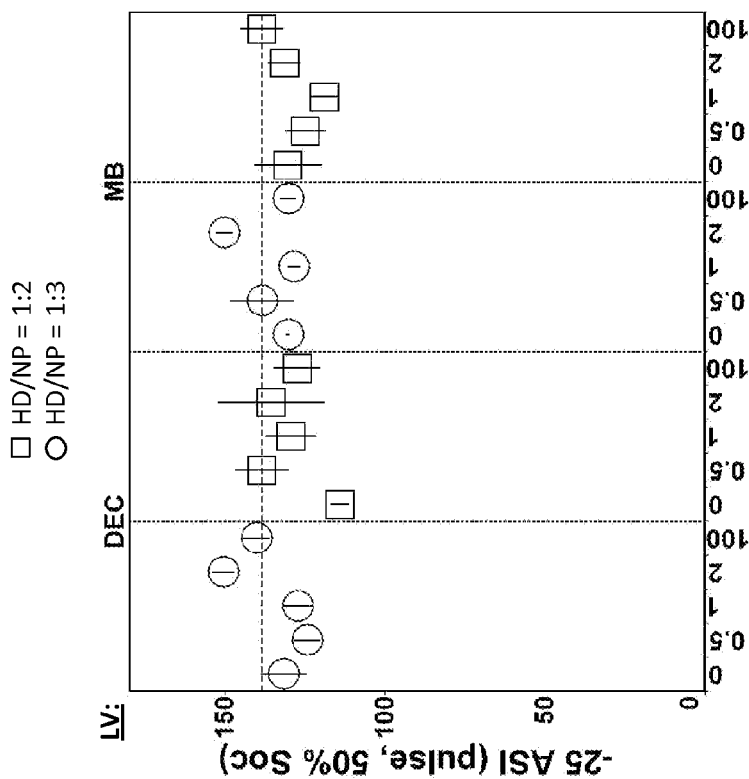

FIGS. 8A and 8B illustrate low temperature and high temperature electrochemical performance characterization of battery cells assembled to contain electrolyte solutions made from formulations of certain embodiments of the invention and control electrolyte solutions. In these embodiments, the ratio of HD solvents to certain LV solvents was varied along with the ratios of sulfolane to PC.

The LV solvents were MB or DEC; and the NP solvents were EMC+DMC+LV (at a ratio of 3:4:1). The ratios of HD:NP were 1:2 or 1:3. The ration of PC:sulfolane was 1:2, 1:1, 2:1. The control formulation was PC/EMC/DMC/MB (2/3/4/1, v/v) 1.2M LiPF6 and is represented by a dotted line in the figures.

FIGS. 8A and 8B illustrate improved wide operating temperature performance for a variety of formulations.

An exemplary electrolyte formulations identified in this testing can be represented as:

1.2M LiPF6, PC/SL/EMC/DMC/MB (12.5/12.5/28.1/ 37.5/9.4)

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

What is claimed is:

1. A lithium ion battery cell with improved low temperature impedance performance, comprising:
    a first electrode;
    a second electrode comprising lithium titanate; and
    an electrolyte solution, the electrolyte solution comprising
        a high dielectric solvent formulation including sulfolane and optionally propylene carbonate and a low viscosity solvent comprising at least one of methyl butyrate or methyl trimethyl acetate.

2. The battery cell of claim 1, wherein the low viscosity solvent comprises methyl butyrate.

3. The battery cell of claim 1, wherein the low viscosity solvent comprises methyl trimethyl acetate.

4. The battery cell of claim 1 wherein the high dielectric solvent formulation comprises a blend of sulfolane and at least one linear carbonate solvent.

5. The battery cell of claim 4 wherein the linear carbonate solvent is ethyl methyl carbonate, dimethyl carbonate, or a combination thereof.

6. The battery cell of claim 1 wherein the electrolyte solution comprises sulfolane and methyl butyrate.

7. The battery cell of claim 1 wherein the electrolyte solution comprises sulfolane and further comprises methyl propionate.

8. The battery cell of claim 1 wherein the electrolyte solution comprises sulfolane and further comprises isobutyl acetate.

9. The battery cell of claim 1 wherein the electrolyte solution comprises sulfolane and methyl trimethyl acetate.

10. The battery cell of claim 1 wherein the electrolyte solution comprises sulfolane and further comprises methyl isovalerate.

11. The battery cell of claim 4 wherein the electrolyte solution comprises methyl butyrate.

12. The battery cell of claim 4 wherein the electrolyte solution comprises diethyl carbonate.

* * * * *